(12) United States Patent
Morris et al.

(10) Patent No.: US 9,382,935 B2
(45) Date of Patent: Jul. 5, 2016

(54) ELASTIC TUBULAR ATTACHMENT ASSEMBLY FOR MATING COMPONENTS AND METHOD OF MATING COMPONENTS

(71) Applicant: GM GLOBAL TECHNOLOGY OPERATIONS LLC, Detroit, MI (US)

(72) Inventors: Steven E. Morris, Fair Haven, MI (US); Jennifer P. Lawall, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 505 days.

(21) Appl. No.: 13/856,927

(22) Filed: Apr. 4, 2013

(65) Prior Publication Data

US 2014/0301777 A1    Oct. 9, 2014

(51) Int. Cl.
| | |
|---|---|
| F16B 2/22 | (2006.01) |
| F16B 17/00 | (2006.01) |
| B60R 13/02 | (2006.01) |
| F16B 5/06 | (2006.01) |

(52) U.S. Cl.
CPC ........... *F16B 17/006* (2013.01); *B60R 13/0206* (2013.01); *F16B 5/0642* (2013.01); *B60R 2013/0293* (2013.01); *Y10T 29/49872* (2015.01); *Y10T 403/4949* (2015.01)

(58) Field of Classification Search
CPC ..... B60R 13/0206; F16B 2/22; F16B 19/002; F16B 19/004
See application file for complete search history.

(56) References Cited

U.S. PATENT DOCUMENTS

| | | | |
|---|---|---|---|
| 1,219,398 A | 3/1917 | Huntsman | |
| 1,261,036 A | 4/1918 | Kerns | |
| 1,301,302 A | 4/1919 | Nolan | |
| 1,556,233 A | 10/1925 | Maise | |
| 1,819,126 A | 8/1931 | Scheibe | |
| 1,929,848 A | 10/1933 | Neely | |
| 1,968,168 A * | 7/1934 | Place | 52/511 |

(Continued)

FOREIGN PATENT DOCUMENTS

| | | |
|---|---|---|
| CN | 1036250 A | 10/1989 |
| CN | 1129162 A | 8/1996 |

(Continued)

OTHER PUBLICATIONS

"Coupling Types—Elastic Averaging." MIT. Aug. 3, 2012, [online], [retrieved on Nov. 12, 2014]. Retrieved from the Internet <URL:https://web.archive.org/web/20120308055935/http://pergatory.mit.edu/kinematiccouplings/html/about/elastic_averaging.html>.

(Continued)

*Primary Examiner* — Michael P Ferguson
(74) *Attorney, Agent, or Firm* — Cantor Colburn LLP

(57) ABSTRACT

An elastic tubular attachment assembly for mating components is provided. The elastic tubular attachment assembly includes a first component having a first surface. Also included is a second component having a second surface, a third surface, and at least one aperture, wherein the second surface is configured to align and engage with the first surface of the first component. Further included is at least one elastically deformable tubular member operatively coupled to the first component proximate the first surface, the at least one elastically deformable tubular member comprising an outer surface, wherein the at least one elastically deformable tubular member is formed of an elastically deformable material and configured to elastically deform radially inwardly upon contact with at least one aperture wall of the second component.

13 Claims, 3 Drawing Sheets

(56) References Cited

U.S. PATENT DOCUMENTS

| | | |
|---|---|---|
| 1,982,076 A | 11/1934 | Spahn |
| 2,006,525 A | 7/1935 | Thal |
| 2,267,558 A | 12/1941 | Birger et al. |
| 2,275,103 A | 3/1942 | Gooch et al. |
| 2,275,900 A | 3/1942 | Hall |
| 2,482,488 A | 9/1949 | Franc |
| 2,612,139 A | 9/1952 | Collins |
| 2,688,894 A | 9/1954 | Modrey |
| 2,707,607 A | 5/1955 | O'Connor |
| 2,778,399 A | 1/1957 | Mroz |
| 2,780,128 A | 2/1957 | Rapata |
| 2,862,040 A | 11/1958 | Curran |
| 2,902,902 A | 9/1959 | Slone |
| 2,946,612 A | 7/1960 | Ahlgren |
| 3,005,282 A | 10/1961 | Christiansen |
| 3,014,563 A | 12/1961 | Bratton |
| 3,087,352 A | 4/1963 | Daniel |
| 3,089,269 A | 5/1963 | McKiernan |
| 3,130,512 A | 4/1964 | Van Buren, Jr. |
| 3,168,961 A | 2/1965 | Yates |
| 3,169,004 A | 2/1965 | Rapata |
| 3,169,439 A | 2/1965 | Rapata |
| 3,188,731 A | 6/1965 | Sweeney |
| 3,194,292 A | 7/1965 | Borowsky |
| 3,213,189 A | 10/1965 | Mitchell et al. |
| 3,230,592 A | 1/1966 | Hosea |
| 3,233,358 A | 2/1966 | Dehm |
| 3,233,503 A | 2/1966 | Birger |
| 3,244,057 A | 4/1966 | Mathison |
| 3,248,995 A | 5/1966 | Meyer |
| 3,291,495 A | 12/1966 | Liebig |
| 3,310,929 A | 3/1967 | Garvey |
| 3,413,752 A | 12/1968 | Perry |
| 3,473,283 A | 10/1969 | Meyer |
| 3,531,850 A | 10/1970 | Durand |
| 3,643,968 A | 2/1972 | Horvath |
| 3,680,272 A | 8/1972 | Meyer |
| 3,842,565 A * | 10/1974 | Brown et al. ............... 52/717.05 |
| 3,845,961 A | 11/1974 | Byrd, III |
| 3,847,492 A | 11/1974 | Kennicutt et al. |
| 3,895,408 A | 7/1975 | Leingang |
| 3,905,570 A | 9/1975 | Nieuwveld |
| 3,972,550 A | 8/1976 | Boughton |
| 4,035,874 A | 7/1977 | Liljendahl |
| 4,039,215 A | 8/1977 | Minhinnick |
| 4,042,307 A | 8/1977 | Jarvis |
| 4,043,585 A | 8/1977 | Yamanaka |
| 4,158,511 A | 6/1979 | Herbenar |
| 4,169,297 A | 10/1979 | Weihrauch |
| 4,213,675 A | 7/1980 | Pilhall |
| 4,237,573 A | 12/1980 | Weihrauch |
| 4,300,851 A | 11/1981 | Thelander |
| 4,313,609 A | 2/1982 | Clements |
| 4,318,208 A | 3/1982 | Borja et al. |
| 4,325,574 A * | 4/1982 | Umemoto et al. ............ 293/120 |
| 4,363,839 A * | 12/1982 | Watanabe et al. .............. 428/31 |
| 4,364,150 A | 12/1982 | Remington |
| 4,384,803 A | 5/1983 | Cachia |
| 4,394,853 A | 7/1983 | Lopez-Crevillen et al. |
| 4,406,033 A | 9/1983 | Chisholm et al. |
| 4,477,142 A | 10/1984 | Cooper |
| 4,481,160 A | 11/1984 | Bree |
| 4,575,060 A | 3/1986 | Kitagawa |
| 4,605,575 A | 8/1986 | Auld et al. |
| 4,616,951 A | 10/1986 | Maatela |
| 4,648,649 A | 3/1987 | Beal |
| 4,654,760 A | 3/1987 | Matheson et al. |
| 4,745,656 A | 5/1988 | Revlett |
| 4,767,647 A | 8/1988 | Bree |
| 4,805,272 A | 2/1989 | Yamaguchi |
| 4,807,335 A | 2/1989 | Candea |
| 4,817,999 A | 4/1989 | Drew |
| 4,819,983 A | 4/1989 | Alexander et al. |
| 4,881,764 A | 11/1989 | Takahashi et al. |
| 4,973,212 A | 11/1990 | Jacobs |
| 4,977,648 A | 12/1990 | Eckerud |
| 5,139,285 A | 8/1992 | Lasinski |
| 5,154,479 A | 10/1992 | Sautter, Jr. |
| 5,170,985 A | 12/1992 | Killworth et al. |
| 5,180,219 A | 1/1993 | Geddie |
| 5,208,507 A | 5/1993 | Jung |
| 5,212,853 A | 5/1993 | Kaneko |
| 5,234,122 A | 8/1993 | Cherng |
| 5,297,322 A | 3/1994 | Kraus |
| 5,342,139 A | 8/1994 | Hoffman |
| 5,368,797 A | 11/1994 | Quentin et al. |
| 5,397,206 A | 3/1995 | Sihon |
| 5,446,965 A | 9/1995 | Makridis |
| 5,507,610 A | 4/1996 | Benedetti et al. |
| 5,513,603 A | 5/1996 | Ang et al. |
| 5,524,786 A | 6/1996 | Skudlarek |
| 5,538,079 A | 7/1996 | Pawlick |
| 5,556,808 A | 9/1996 | Williams et al. |
| 5,575,601 A | 11/1996 | Skufca et al. |
| 5,577,301 A | 11/1996 | Demaagd |
| 5,577,779 A | 11/1996 | Dangel |
| 5,580,204 A | 12/1996 | Hultman |
| 5,586,372 A | 12/1996 | Eguchi et al. |
| 5,601,453 A | 2/1997 | Horchler |
| 5,634,757 A | 6/1997 | Schanz |
| 5,657,516 A | 8/1997 | Berg et al. |
| 5,667,271 A | 9/1997 | Booth |
| 5,670,013 A | 9/1997 | Huang et al. |
| 5,698,276 A | 12/1997 | Mirabitur |
| 5,736,221 A | 4/1998 | Hardigg et al. |
| 5,765,942 A | 6/1998 | Shirai et al. |
| 5,795,118 A | 8/1998 | Osada et al. |
| 5,797,170 A | 8/1998 | Akeno |
| 5,803,646 A | 9/1998 | Weihrauch |
| 5,806,915 A | 9/1998 | Takabatake |
| 5,810,535 A | 9/1998 | Fleckenstein et al. |
| 5,820,292 A | 10/1998 | Fremstad |
| 5,846,631 A | 12/1998 | Nowosiadly |
| 5,941,673 A | 8/1999 | Hayakawa et al. |
| 6,073,315 A | 6/2000 | Rasmussen |
| 6,095,594 A * | 8/2000 | Riddle et al. ................... 296/191 |
| 6,164,603 A | 12/2000 | Kawai |
| 6,193,430 B1 | 2/2001 | Culpepper et al. |
| 6,202,962 B1 | 3/2001 | Snyder |
| 6,209,175 B1 | 4/2001 | Gershenson |
| 6,209,178 B1 | 4/2001 | Wiese et al. |
| 6,264,869 B1 | 7/2001 | Notarpietro et al. |
| 6,299,478 B1 | 10/2001 | Jones et al. |
| 6,321,495 B1 | 11/2001 | Oami |
| 6,349,904 B1 | 2/2002 | Polad |
| 6,354,815 B1 | 3/2002 | Svihla et al. |
| 6,378,931 B1 | 4/2002 | Kolluri et al. |
| 6,398,449 B1 | 6/2002 | Loh |
| 6,484,370 B2 | 11/2002 | Kanie et al. |
| 6,485,241 B1 | 11/2002 | Oxford |
| 6,523,817 B1 | 2/2003 | Landry, Jr. |
| 6,533,391 B1 | 3/2003 | Pan |
| 6,543,979 B2 | 4/2003 | Iwatsuki |
| 6,557,260 B1 | 5/2003 | Morris |
| 6,568,701 B1 | 5/2003 | Burdack et al. |
| 6,579,397 B1 | 6/2003 | Spain et al. |
| 6,591,801 B1 | 7/2003 | Fonville |
| 6,609,717 B2 | 8/2003 | Hinson |
| 6,658,698 B2 | 12/2003 | Chen |
| 6,662,411 B2 | 12/2003 | Rubenstein |
| 6,664,470 B2 | 12/2003 | Nagamoto |
| 6,677,065 B2 | 1/2004 | Blauer |
| 6,692,016 B2 | 2/2004 | Yokota |
| 6,712,329 B2 | 3/2004 | Ishigami et al. |
| 6,746,172 B2 | 6/2004 | Culpepper |
| 6,799,758 B2 | 10/2004 | Fries |
| 6,840,969 B2 | 1/2005 | Kobayashi et al. |
| 6,857,676 B2 | 2/2005 | Kawaguchi et al. |
| 6,857,809 B2 | 2/2005 | Granata |
| 6,908,117 B1 | 6/2005 | Pickett, Jr. et al. |
| 6,932,416 B2 | 8/2005 | Clauson |
| 6,948,753 B2 | 9/2005 | Yoshida et al. |
| 6,951,349 B2 | 10/2005 | Yokota |
| 6,959,954 B2 | 11/2005 | Brandt et al. |

(56) References Cited

U.S. PATENT DOCUMENTS

| | | | |
|---|---|---|---|
| 6,966,601 B2 * | 11/2005 | Matsumoto et al. | 296/146.2 |
| 6,971,831 B2 | 12/2005 | Fattori et al. | |
| 6,997,487 B2 | 2/2006 | Kitzis | |
| 7,000,941 B2 | 2/2006 | Yokota | |
| 7,008,003 B1 | 3/2006 | Hirose et al. | |
| 7,014,094 B2 | 3/2006 | Alcoe | |
| 7,017,239 B2 | 3/2006 | Kurily et al. | |
| 7,036,779 B2 | 5/2006 | Kawaguchi et al. | |
| 7,055,849 B2 | 6/2006 | Yokota | |
| 7,059,628 B2 | 6/2006 | Yokota | |
| 7,073,260 B2 | 7/2006 | Jensen | |
| 7,089,998 B2 | 8/2006 | Crook | |
| 7,097,198 B2 | 8/2006 | Yokota | |
| 7,121,611 B2 | 10/2006 | Hirotani et al. | |
| 7,144,183 B2 | 12/2006 | Lian et al. | |
| 7,172,210 B2 | 2/2007 | Yokota | |
| 7,178,855 B2 | 2/2007 | Catron et al. | |
| 7,198,315 B2 | 4/2007 | Cass et al. | |
| 7,234,852 B2 | 6/2007 | Nishizawa et al. | |
| 7,306,418 B2 | 12/2007 | Kornblum | |
| 7,322,500 B2 | 1/2008 | Maierholzner | |
| 7,344,056 B2 | 3/2008 | Shelmon et al. | |
| 7,360,964 B2 | 4/2008 | Tsuya | |
| 7,369,408 B2 | 5/2008 | Chang | |
| 7,435,031 B2 | 10/2008 | Granata | |
| 7,454,105 B2 | 11/2008 | Yi | |
| 7,487,884 B2 | 2/2009 | Kim | |
| 7,493,716 B2 | 2/2009 | Brown | |
| 7,557,051 B2 | 7/2009 | Ryu et al. | |
| 7,568,316 B2 | 8/2009 | Choby et al. | |
| D602,349 S | 10/2009 | Andersson | |
| 7,672,126 B2 | 3/2010 | Yeh | |
| 7,677,650 B2 | 3/2010 | Huttenlocher | |
| 7,764,853 B2 | 7/2010 | Yi et al. | |
| 7,793,998 B2 | 9/2010 | Matsui et al. | |
| 7,802,831 B2 | 9/2010 | Isayama et al. | |
| 7,828,372 B2 | 11/2010 | Ellison | |
| 7,862,272 B2 | 1/2011 | Nakajima | |
| 7,869,003 B2 | 1/2011 | Van Doren et al. | |
| 7,883,137 B2 | 2/2011 | Bar | |
| 7,922,415 B2 | 4/2011 | Rudduck et al. | |
| 7,946,684 B2 | 5/2011 | Drury et al. | |
| 8,029,222 B2 * | 10/2011 | Nitsche | 411/510 |
| 8,061,861 B2 | 11/2011 | Paxton et al. | |
| 8,101,264 B2 | 1/2012 | Pace et al. | |
| 8,136,819 B2 | 3/2012 | Yoshitsune et al. | |
| 8,162,375 B2 | 4/2012 | Gurtatowski et al. | |
| 8,203,496 B2 | 6/2012 | Miller et al. | |
| 8,203,843 B2 | 6/2012 | Chen | |
| 8,261,581 B2 | 9/2012 | Cerruti et al. | |
| 8,276,961 B2 | 10/2012 | Kwolek | |
| 8,297,137 B2 | 10/2012 | Dole | |
| 8,297,661 B2 | 10/2012 | Proulx et al. | |
| 8,414,048 B1 | 4/2013 | Kwolek | |
| 8,444,199 B2 | 5/2013 | Takeuchi et al. | |
| 8,677,573 B2 | 3/2014 | Lee | |
| 8,695,201 B2 | 4/2014 | Morris | |
| 8,720,016 B2 | 5/2014 | Beaulieu | |
| 8,726,473 B2 | 5/2014 | Dole | |
| 8,826,499 B2 | 9/2014 | Tempesta | |
| 8,833,832 B2 | 9/2014 | Whipps | |
| 8,834,058 B2 | 9/2014 | Woicke | |
| 9,039,318 B2 | 5/2015 | Mantei et al. | |
| 9,050,690 B2 | 6/2015 | Hammer et al. | |
| 9,061,715 B2 | 6/2015 | Morris | |
| 9,067,625 B2 | 6/2015 | Morris | |
| 2001/0030414 A1 | 10/2001 | Yokota | |
| 2001/0045757 A1 | 11/2001 | Kanie et al. | |
| 2002/0045086 A1 | 4/2002 | Tsuji et al. | |
| 2002/0060275 A1 | 5/2002 | Polad | |
| 2002/0092598 A1 | 7/2002 | Jones et al. | |
| 2002/0136617 A1 | 9/2002 | Imahigashi | |
| 2003/0007831 A1 | 1/2003 | Lian et al. | |
| 2003/0080131 A1 | 5/2003 | Fukuo | |
| 2003/0082986 A1 | 5/2003 | Wiens et al. | |
| 2003/0087047 A1 | 5/2003 | Blauer | |
| 2003/0108401 A1 | 6/2003 | Agha et al. | |
| 2003/0180122 A1 | 9/2003 | Dobson | |
| 2004/0037637 A1 | 2/2004 | Lian et al. | |
| 2004/0131896 A1 | 7/2004 | Blauer | |
| 2004/0139678 A1 | 7/2004 | Pervan | |
| 2004/0140651 A1 | 7/2004 | Yokota | |
| 2004/0208728 A1 | 10/2004 | Fattori et al. | |
| 2005/0016116 A1 | 1/2005 | Scherff | |
| 2005/0031946 A1 | 2/2005 | Kruger et al. | |
| 2005/0054229 A1 | 3/2005 | Tsuya | |
| 2005/0082449 A1 | 4/2005 | Kawaguchi et al. | |
| 2005/0156409 A1 | 7/2005 | Yokota | |
| 2005/0156410 A1 | 7/2005 | Yokota | |
| 2005/0156416 A1 | 7/2005 | Yokota | |
| 2005/0244250 A1 | 11/2005 | Okada et al. | |
| 2006/0102214 A1 | 5/2006 | Clemons | |
| 2006/0110109 A1 | 5/2006 | Yi et al. | |
| 2006/0113755 A1 | 6/2006 | Yokota | |
| 2006/0141318 A1 | 6/2006 | MacKinnon et al. | |
| 2006/0197356 A1 | 9/2006 | Catron et al. | |
| 2006/0202449 A1 | 9/2006 | Yokota | |
| 2006/0237995 A1 | 10/2006 | Huttenlocher | |
| 2006/0249520 A1 | 11/2006 | DeMonte | |
| 2006/0264076 A1 | 11/2006 | Chen | |
| 2007/0040411 A1 | 2/2007 | Dauvergne | |
| 2007/0113483 A1 | 5/2007 | Hernandez | |
| 2007/0113485 A1 | 5/2007 | Hernandez | |
| 2007/0126211 A1 | 6/2007 | Moerke et al. | |
| 2007/0144659 A1 | 6/2007 | De La Fuente | |
| 2007/0292205 A1 | 12/2007 | Duval | |
| 2008/0014508 A1 | 1/2008 | Van Doren et al. | |
| 2008/0018128 A1 | 1/2008 | Yamagiwa et al. | |
| 2008/0073888 A1 | 3/2008 | Enriquez | |
| 2008/0094447 A1 | 4/2008 | Drury et al. | |
| 2008/0128346 A1 | 6/2008 | Bowers | |
| 2008/0217796 A1 | 9/2008 | Van Bruggen et al. | |
| 2008/0260488 A1 | 10/2008 | Scroggie et al. | |
| 2009/0028506 A1 | 1/2009 | Yi et al. | |
| 2009/0072591 A1 | 3/2009 | Baumgartner | |
| 2009/0091156 A1 | 4/2009 | Neubrand | |
| 2009/0134652 A1 | 5/2009 | Araki | |
| 2009/0141449 A1 | 6/2009 | Yeh | |
| 2009/0174207 A1 | 7/2009 | Lota | |
| 2009/0265896 A1 | 10/2009 | Beak | |
| 2010/0001539 A1 | 1/2010 | Kikuchi et al. | |
| 2010/0021267 A1 | 1/2010 | Nitsche | |
| 2010/0061045 A1 | 3/2010 | Chen | |
| 2010/0102538 A1 | 4/2010 | Paxton et al. | |
| 2010/0134128 A1 | 6/2010 | Hobbs | |
| 2010/0147355 A1 | 6/2010 | Shimizu et al. | |
| 2010/0247034 A1 | 9/2010 | Yi et al. | |
| 2010/0270745 A1 | 10/2010 | Hurlbert et al. | |
| 2011/0012378 A1 | 1/2011 | Ueno et al. | |
| 2011/0076588 A1 | 3/2011 | Yamaura | |
| 2011/0119875 A1 * | 5/2011 | Iwasaki | 24/458 |
| 2011/0131918 A1 | 6/2011 | Glynn | |
| 2011/0175376 A1 | 7/2011 | Whitens et al. | |
| 2011/0207024 A1 | 8/2011 | Bogumil et al. | |
| 2011/0239418 A1 | 10/2011 | Huang | |
| 2011/0296764 A1 | 12/2011 | Sawatani et al. | |
| 2011/0311332 A1 | 12/2011 | Ishman | |
| 2012/0020726 A1 | 1/2012 | Jan | |
| 2012/0073094 A1 | 3/2012 | Bishop | |
| 2012/0115010 A1 | 5/2012 | Smith et al. | |
| 2012/0240363 A1 | 9/2012 | Lee | |
| 2012/0251226 A1 | 10/2012 | Liu et al. | |
| 2012/0261951 A1 | 10/2012 | Mildner et al. | |
| 2012/0321379 A1 | 12/2012 | Wang et al. | |
| 2013/0019454 A1 | 1/2013 | Colombo et al. | |
| 2013/0019455 A1 | 1/2013 | Morris | |
| 2013/0027852 A1 | 1/2013 | Wang | |
| 2013/0071181 A1 | 3/2013 | Herzinger et al. | |
| 2013/0157015 A1 | 6/2013 | Morris | |
| 2013/0212858 A1 | 8/2013 | Herzinger et al. | |
| 2013/0269873 A1 | 10/2013 | Herzinger et al. | |
| 2013/0287992 A1 | 10/2013 | Morris | |
| 2014/0033493 A1 | 2/2014 | Morris et al. | |
| 2014/0041176 A1 | 2/2014 | Morris | |

(56) References Cited

U.S. PATENT DOCUMENTS

| | | | |
|---|---|---|---|
| 2014/0041185 | A1 | 2/2014 | Morris et al. |
| 2014/0041199 | A1 | 2/2014 | Morris |
| 2014/0042704 | A1 | 2/2014 | Polewarczyk |
| 2014/0047691 | A1 | 2/2014 | Colombo et al. |
| 2014/0047697 | A1 | 2/2014 | Morris |
| 2014/0080036 | A1 | 3/2014 | Smith et al. |
| 2014/0132023 | A1 | 5/2014 | Watanabe et al. |
| 2014/0175774 | A1 | 6/2014 | Kansteiner |
| 2014/0202628 | A1 | 7/2014 | Sreetharan et al. |
| 2014/0208561 | A1 | 7/2014 | Colombo et al. |
| 2014/0208572 | A1 | 7/2014 | Colombo et al. |
| 2014/0298638 | A1 | 10/2014 | Colombo et al. |
| 2014/0298640 | A1 | 10/2014 | Morris et al. |
| 2014/0298962 | A1 | 10/2014 | Morris et al. |
| 2014/0301103 | A1 | 10/2014 | Colombo et al. |
| 2015/0069779 | A1 | 3/2015 | Morris et al. |

FOREIGN PATENT DOCUMENTS

| | | | |
|---|---|---|---|
| CN | 1205285 | A | 1/1999 |
| CN | 1328521 | A | 12/2001 |
| CN | 1426872 | A | 7/2003 |
| CN | 2661972 | Y | 12/2004 |
| CN | 1670986 | A | 9/2005 |
| CN | 100573975 | C | 9/2005 |
| CN | 1693721 | A | 11/2005 |
| CN | 1771399 | A | 5/2006 |
| CN | 1774580 | A | 5/2006 |
| CN | 2888807 | Y | 4/2007 |
| CN | 2915389 | Y | 6/2007 |
| CN | 101250964 | A | 4/2008 |
| CN | 201259846 | Y | 6/2009 |
| CN | 201268336 | y | 7/2009 |
| CN | 201310827 | Y | 9/2009 |
| CN | 201540513 | U | 8/2010 |
| CN | 101821534 | | 9/2010 |
| CN | 201703439 | U | 1/2011 |
| CN | 201737062 | U | 2/2011 |
| CN | 201792722 | U | 4/2011 |
| CN | 201890285 | U | 7/2011 |
| CN | 102144102 | A | 8/2011 |
| CN | 202079532 | U | 12/2011 |
| CN | 102313952 | A | 1/2012 |
| CN | 102756633 | | 10/2012 |
| CN | 202686206 | U | 1/2013 |
| DE | 1220673 | B | 7/1966 |
| DE | 2736012 | A1 | 2/1978 |
| DE | 3704190 | A1 | 12/1987 |
| DE | 3711696 | A1 | 10/1988 |
| DE | 3805693 | A1 | 2/1989 |
| DE | 3815927 | | 11/1989 |
| DE | 9109276 | U1 | 7/1991 |
| DE | 4002443 | A1 | 8/1991 |
| DE | 4111245 | A1 | 10/1991 |
| DE | 9201258 | U1 | 3/1992 |
| DE | 29714892 | U1 | 10/1997 |
| DE | 29800379 | U1 | 5/1998 |
| DE | 69600357 | T2 | 12/1998 |
| DE | 10234253 | B3 | 4/2004 |
| DE | 102008005618 | A1 | 7/2009 |
| DE | 102010028323 | A1 | 11/2011 |
| DE | 102011050003 | A1 | 10/2012 |
| DE | 102012212101 | B3 | 7/2013 |
| EP | 0118796 | | 9/1984 |
| EP | 1132263 | A1 | 9/2001 |
| EP | 1273766 | A1 | 1/2003 |
| EP | 1293384 | A2 | 3/2003 |
| EP | 1384536 | A2 | 1/2004 |
| EP | 1388449 | A1 | 2/2004 |
| EP | 2166235 | A2 | 3/2010 |
| EP | 2450259 | A1 | 5/2012 |
| EP | 2458454 | A1 | 5/2012 |
| FR | 1369198 | A | 8/1964 |
| FR | 2009941 | A1 | 2/1970 |
| FR | 2750177 | A2 | 12/1997 |
| FR | 2958696 | A1 | 10/2011 |
| GB | 2281950 | A | 3/1995 |
| JP | 200117443 | A | 6/2001 |
| JP | 2005268004 | | 9/2005 |
| JP | 2006205918 | | 8/2006 |
| JP | 2008307938 | A | 12/2008 |
| JP | 2009084844 | | 4/2009 |
| JP | 2009187789 | A | 8/2009 |
| WO | 2008140659 | A1 | 11/2008 |
| WO | 2013191622 | A1 | 12/2013 |

OTHER PUBLICATIONS

U.S. Appl. No. 13/939,503, filed Jul. 11, 2013, entitled "Elastically Averaged Alignment Systems and Methods," inventor: Joel Colombo.

U.S. Appl. No. 13/940,912, filed Jul. 12, 2013, entitled "Alignment Arrangement for Mated Components and Method", inventors: Steven E. Morris and Jennifer P. Lawall.

U.S. Appl. No. 13/945,231, filed Jul. 18, 2013, entitled "Lobular Elastic Tube Alignment System for Providing Precise Four-Way Alignment of Components", Inventors: Steven E. Morris and Jennifer P. Lawall.

U.S. Appl. No. 13/954,198, filed Jul. 30, 2013, entitled "Elastic Alignment and Retention System and Method," inventors: Steven E. Morris, Edward D. Groninger, and Raymond J. Chess.

U.S. Appl. No. 13/966,523, filed Aug. 14, 2013, entitled "Elastically Averaged Alignment Systems and Methods Thereof," inventors: Steven E. Morris, Jennifer P. Lawall and Joel Colombo.

U.S. Appl. No. 13/973,587, filed Aug. 22, 2013, entitled "Elastic Averaging Alignment System and Method," inventors: Steven E. Morris and Jennifer P. Lawall.

U.S. Appl. No. 13/974,729, filed Aug. 23, 2013, entitled "Elastic Averaging Snap Member Aligning and Fastening System", inventors: Steven E. Morris and Jennifer P. Lawall.

U.S. Appl. No. 14/012,205, filed Aug. 28, 2013, entitled "Elastically Deformable Alignment Fastener and System," inventors: Steven E. Morris, Marc J. Tahnoose, Michael E. McGuire and Jennifer P. Lawall.

U.S. Appl. No. 14/021,282, filed Sep. 9, 2013, entitled "Elastic Tube Alignment and Fastening System for Providing Precise Alignment and Fastening of Components," inventors: Steven E. Morris and Jennifer P. Lawall.

U.S. Appl. No. 14/031,647, filed Sep. 19, 2013, entitled "Elastically Averaged Alignment Systems and Methods," inventors: Steven E. Morris, Joel Colombo, Jennifer P. Lawall, Jeffrey L. Konchan, and Steve J. Briggs.

U.S. Appl. No. 14/038,241, filed Sep. 26, 2013, entitled "Serviceable Aligning and Self-Retaining Elastic Arrangement for Mated Components and Method," inventors: Steven E. Morris, Jennifer P. Lawall and Joel Colombo.

U.S. Appl. No. 14/039,614, filed Sep. 27, 2013, entitled "Elastically Averaged Alignment Systems and Methods," inventor: Steven E. Morris.

U.S. Appl. No. 14/044,199, filed Oct. 2, 2013, entitled "Lobular Elastic Tube Alignment and Retention System for Providing Precise Alignment of Components," inventors: Steven E. Morris and Jennifer P. Lawall.

U.S. Appl. No. 14/044,207, filed Oct. 2, 2013, entitled "Elastic Aperture Alignment System for Providing Precise Four-Way Alignment of Components," inventors: Steven E. Morris and Jennifer P. Lawall.

U.S. Appl. No. 14/045,463, filed Oct. 3, 2013, entitled "Elastically Averaged Alignment Systems and Methods," inventors: Steven E. Morris and Jennifer P. Lawall.

U.S. Appl. No. 14/081,361, filed Nov. 15, 2013, entitled "Elastically Deformable Clip and Method," inventors: Steven E. Morris, Jennifer P. Lawall and Jeffrey M. Gace.

U.S. Appl. No. 14/104,321, filed Dec. 12, 2013, entitled "Alignment and Retention System for a Flexible Assembly," inventors: Steven E. Morris and Jennifer P. Lawall.

(56) References Cited

OTHER PUBLICATIONS

U.S. Appl. No. 14/104,327, filed Dec. 12, 2013, entitled "Self-Retaining Alignment System for Providing Precise Alignment and Retention of Components," inventors: Steven E. Morris, Jennifer P. Lawall and Toure D. Lee.
U.S. Appl. No. 14/104,333, filed Dec. 12, 2013, entitled "Alignment System for Providing Precise Alignment and Retention of Components of a Sealable Compartment," inventors: Steven E. Morris, Christopher J. Georgi, Jennifer P. Lawall and Gordan N. Noll.
U.S. Appl. No. 14/104,541, filed Dec. 12, 2013, entitled "Alignment and Retention System for Providing Precise Alignment and Retention of Components," inventors: Steven E. Morris and Jennifer P. Lawall.
U.S. Appl. No. 14/104,549, filed Dec. 12, 2013, entitled "Alignment System for Providing Alignment of Components Having Contoured Features," inventors: Steven E. Morris and Jennifer P. Lawall.
U.S. Appl. No. 14/108,921, filed Dec. 17, 2013, entitled "Elastically Averaged Alignment Systems and Methods Thereof," inventors: Steven E. Morris and Jennifer P. Lawall.
U.S. Appl. No. 14/108,931, filed Dec. 17, 2013, entitled "Elastically Averaged Strap Systems and Methods," inventors: Steven E. Morris and Jennifer P. Lawall.
U.S. Appl. No. 14/109,296, filed Dec. 17, 2013, entitled "Fastener for Operatively Coupling Matable Components," inventors: Steven E. Morris and Jennifer P. Lawall.
U.S. Appl. No. 14/134,622, filed Dec. 19, 2013, entitled "Elastic Averaging Alignment Member," inventors: Steven E. Morris and Jennifer P. Lawall.
U.S. Appl. No. 14/134,801, filed Dec. 19, 2013, entitled "Elastically Averaged Alignment Systems and Methods," inventors: Steven E. Morris and Jennifer P. Lawall.
U.S. Appl. No. 14/134,844, filed Dec. 19, 2013, entitled "Elastically Deformable Module Installation Assembly," inventors: Steven E. Morris and Jennifer P. Lawall.
U.S. Appl. No. 14/134,888, filed Dec. 19, 2013, entitled "Elastic Retaining Assembly and Method," inventors: Steven E. Morris and Jennifer P. Lawall.
U.S. Appl. No. 14/136,502, filed Dec. 20, 2013, entitled "Elastically Averaged Alignment Systems and Methods," inventors: Timothy A. Kiester, Steven E. Morris, Kenton L. West, Scott J. Fast, and Evan Phillips.
U.S. Appl. No. 14/151,279, filed Jan. 9, 2014, entitled "Elastically Averaged Alignment Systems and Methods," inventors: Steven E. Morris and Jennifer P. Lawall.
U.S. Appl. No. 14/153,741, filed Jan. 13, 2014, entitled "Elastically Averaged Assembly for Closure Applications," inventors: Steven E. Morris, Jeffrey A. Abell, Jennifer P. Lawall, and Jeffrey L. Konchan.
U.S. Appl. No. 14/180,882, filed Feb. 14, 2014, entitled "Elastic Tube Alignment System for Precisely Locating Components," inventor: Steven E. Morris.
U.S. Appl. No. 14/181,142, filed Feb. 14, 2014, entitled "Elastic Tube Alignment System for Precisely Locating Components," inventor: Steven E. Morris.
U.S. Appl. No. 14/185,422, filed Feb. 20, 2014, entitled "Elastically Averaged Alignment Systems and Methods," inventors: Joel Colombo, Steven E. Morris, Jennifer P. Lawall and Ashish M. Gollapalli.
U.S. Appl. No. 14/185,472, filed Feb. 20, 2014, entitled "Elastically Averaged Alignment Systems and Method," inventors: Steven E. Morris, Jennifer P. Lawall and Kee Hyuk Im.
U.S. Appl. No. 14/231,395, filed Mar. 31, 2014, entitled "Elastically Averaged Alignment Systems and Methods," inventors: Joel Colombo, Steven E. Morris, Jennifer P. Lawall, and Ashish M. Gollapalli.
U.S. Appl. No. 14/249,746, filed Apr. 10, 2014, entitled "Elastically Averaged Alignment Systems and Methods," inventors: Joel Colombo and Catherine A. Ostrander.
U.S. Appl. No. 14/259,747, filed Apr. 23, 2014, entitled "System for Elastically Averaging Assembly of Components," inventors: Steven E. Morris and Jennifer P. Lawall.

Cross-sectional view of a prior art infrared welded assembly of BMW, Munich, Germany. Believed on the market since about Jan. 1, 2010.
"Elastic Averaging in Flexture Mechanisms: A Multi-Beam Paralleaogram Flexture Case-Study" by Shorya Awtar and Edip Sevincer, Proceedings of IDETC/CIE 2006, Paper DETC2006-99752, American Society of Mechanical Engineers (ASME), Sep. 2006.
"An Anti Backlash Two-Part Shaft Coupling With Interlocking Elastically Averaged Teeth" by Mahadevan Balasubramaniam, Edmund Golaski, Seung-Kil Son, Krishnan Sriram, and Alexander Slocum, Precision Engineering, V. 26, No. 3, Elsevier Publishing, Jul. 2002.
"The Design of High Precision Parallel Mechnisms Using Binary Actuation and Elastic Averaging: With Application to MRI Cancer Treatment" by L.M. Devita, J.S. Plante, and S. Dubowsky, 12th IFToMM World Congress (France), Jun. 2007.
"Passive Alignment of Micro-Fluidic Chips Using the Principle of Elastic Averaging" by Sitanshu Gurung, Thesis, Louisiana State University, Dept. of Mechanical Engineering, Dec. 2007.
"Precision Connector Assembly Using Elastic Averaging" by Patrick J. Willoughby and Alexander H. Slocum, Massachusetts Institute of Technology (MIT), Cambridge, MA, American Society for Precision Engineering, 2004.
U.S. Appl. No. 13/229,926, filed Sep. 12, 2011, entitled "Using Elastic Averaging for Alignment of Battery Stack, Fuel Cell Stack, or Other Vehicle Assembly", inventors: Mark A. Smith, Ronald Daul, Xiang Zhao, David Okonski, Elmer Santos, Lane Lindstrom, and Jeffrey A. Abell.
U.S. Appl. No. 13/330,718, filed Dec. 20, 2011, entitled "Precisely Locating Components in an Infrared Welded Assembly", inventor: Steven E. Morris.
U.S. Appl. No. 13/459,118, filed Apr. 28, 2012, entitled "Stiffened Multi-Layer Compartment Door Assembly Utilizing Elastic Averaging," inventor: Steven E. Morris.
U.S. Appl. No. 13/567,580, filed Aug. 6, 2012, entitled "Semi-Circular Alignment Features of an Elastic Averaging Alignment System", inventors: Steven E. Morris and Thomas F. Bowles.
U.S. Appl. No. 13/570,959, filed Aug. 9, 2012, entitled "Elastic Cantilever Beam Alignment System for Precisely Aligning Components", inventor: Steven E. Morris.
U.S. Appl. No. 13/571,030, filed Aug. 9, 2012, entitled "Elastic Tube Alignment System for Precisely Locating an Emblem Lens to an Outer Bezel", inventors: Joel Colombo, Steven E. Morris, and Michael D. Richardson.
U.S. Appl. No. 13/752,449, filed Jan. 29, 2013, entitled "Elastic Insert Alignment Assembly and Method of Reducing Positional Variation", inventors: Steven E. Morris and Michael D. Richardson.
U.S. Appl. No. 13/755,759, filed Jan. 31, 2013, entitled "Elastic Alignment Assembly for Aligning Mated Components and Method of Reducing Positional Variation", inventors: Joel Colombo, Michael D. Richardson, and Steven E. Morris.
U.S. Appl. No. 13/851,222, filed Mar. 27, 2013, entitled "Elastically Averaged Alignment System", inventors: Joel Colombo and Steven E. Morris.
U.S. Appl. No. 13/855,928, filed Apr. 3, 2013, entitled "Elastic Averaging Alignment System, Method of Making the Same and Cutting Punch Therefor", inventors: Steven E. Morris, Jennifer P. Lawall, Joel Colombo, and Jeffrey L. Konchan.
U.S. Appl. No. 13/856,888, filed Apr. 4, 2013, entitled "Elastic Retaining Assembly for Matable Components and Method of Assembling", inventors: Steven E. Morris, Jennifer P. Lawall, Joel Colombo, and Toure D. Lee.
U.S. Appl. No. 13/856,927, filed Apr. 4, 2013, entitled "Elastic Tubular Attachment Assembly for Mating Components and Method of Mating Components", inventors: Steven E. Morris and Jennifer P. Lawall.
U.S. Appl. No. 13/856,956, filed Apr. 4, 2013, entitled "Elastic Clip Retaining Arrangement and Method of Mating Structures with an Elastic Clip Retaining Arrangement", inventors: Joel Colombo, Steven E. Morris and Jeffrey L. Konchan.
U.S. Appl. No. 13/856,973, filed Apr. 4, 2013, entitled "Elastically Deformable Flange Locator Arrangement and Method of Reducing Positional Variation", inventors: Joel Colombo, Steven E. Morris and Michael D. Richardson.

(56) References Cited

OTHER PUBLICATIONS

U.S. Appl. No. 13/858,478, filed Apr. 8, 2013, entitled "Elastic Mating Assembly and Method of Elastically Assembling Matable Components", inventors: Steven E. Morris and Jennifer P. Lawall.

U.S. Appl. No. 13/859,109, filed Apr. 9, 2013, entitled "Elastic Retaining Arrangement for Jointed Components and Method of Reducing a Gap Between Jointed Components," inventors: Steven E. Morris, James M. Kushner, Victoria L. Enyedy, Jennifer P. Lawall, and Piotr J. Ogonek.

U.S. Appl. No. 13/915,132, filed Jun. 11, 2013, entitled "Elastically Deformable Energy Management Arrangement and Method of Managing Energy Absorption," inventors: Steven E. Morris, Randy A. Johnson and Jennifer P. Lawall.

U.S. Appl. No. 13/915,177, filed Jun. 11, 2013, entitled "Elastically Deformable Energy Management Assembly and Method of Managing Energy Absorption," inventors: Steven E. Morris, Jennifer P. Lawall, and Randy Johnson.

U.S. Appl. No. 13/917,005, filed Jun. 13, 2013, entitled "Elastic Attachment Assembly and Method of Reducing Positional Variation and Increasing Stiffness," inventors: Steven E. Morris and Jennifer P. Lawall.

U.S. Appl. No. 13/917,074, filed Jun. 13, 2013, entitled "Elastically Deformable Retaining Hook for Components to be Mated Together and Method of Assembling", inventors: Joel Colombo, Jeffrey L. Konchan, Steven E. Morris, and Steve J. Briggs.

U.S. Appl. No. 13/918,183, filed Jun. 14, 2013, entitled "Elastic Retaining Assembly for Matable Components and Method of Assembling," inventors: Steven E. Morris and Jennifer P. Lawall.

\* cited by examiner

US 9,382,935 B2

ELASTIC TUBULAR ATTACHMENT ASSEMBLY FOR MATING COMPONENTS AND METHOD OF MATING COMPONENTS

FIELD OF THE INVENTION

The present invention relates to a matable component assembly, and more particularly to an elastic tubular attachment assembly, as well as a method of mating components.

BACKGROUND

Currently, components which are to be mated together in a manufacturing process are subject to positional variation based on the mating arrangements between the components. One common arrangement includes components mutually located with respect to each other by 2-way and/or 4-way male alignment features; typically undersized structures which are received into corresponding oversized female alignment features such as apertures in the form of holes and/or slots. Alternatively, adhesives, double-sided tape, or welding processes may be employed to mate parts. Irrespective of the precise mating arrangement, there may be provided a clearance between at least a portion of the alignment features which is predetermined to match anticipated size and positional variation tolerances of the mating features as a result of manufacturing (or fabrication) variances. As a result, occurrence of significant positional variation between the mated components may contribute to the presence of undesirably large and varying gaps and otherwise poor fit. Additional undesirable effects include squeaking, rattling, and overall poor quality perception based on relative motion of the mated components, for example.

SUMMARY OF THE INVENTION

In one exemplary embodiment, an elastic tubular attachment assembly for mating components is provided. The elastic tubular attachment assembly includes a first component having a first surface. Also included is a second component having a second surface, a third surface, and at least one aperture, wherein the second surface is configured to align and engage with the first surface of the first component. Further included is at least one elastically deformable tubular member operatively coupled to the first component proximate the first surface, the at least one elastically deformable tubular member comprising an outer surface, wherein the at least one elastically deformable tubular member is formed of an elastically deformable material and configured to elastically deform radially inwardly upon contact with at least one aperture wall of the second component.

In another exemplary embodiment, a method of mating components is provided. The method includes inserting at least one elastically deformable tubular member of a first component into at least one aperture of a second component. The method also includes contacting an outer surface of the at least one elastically deformable tubular member with at least one aperture wall to impose a contact interference condition between the first component and the second component. The method further includes elastically deforming the at least one deformable tubular member upon contacting the at least one aperture wall. The method yet further includes translating the second component toward the first component and beyond a maximum tubular member width.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
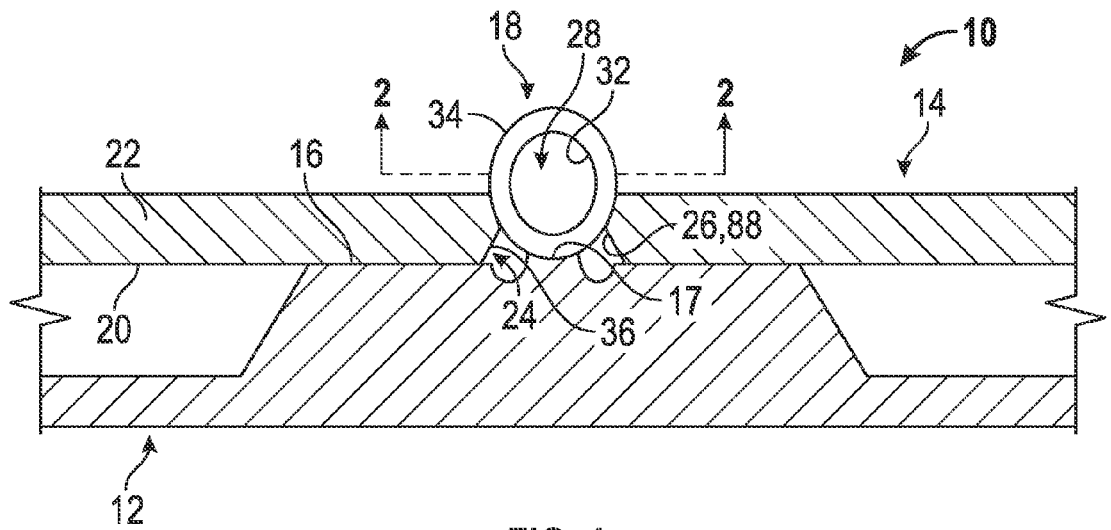
FIG. 1 is an elevational, partial cross-sectional view of an elastic tubular attachment assembly according to a first embodiment.
Figure 2:
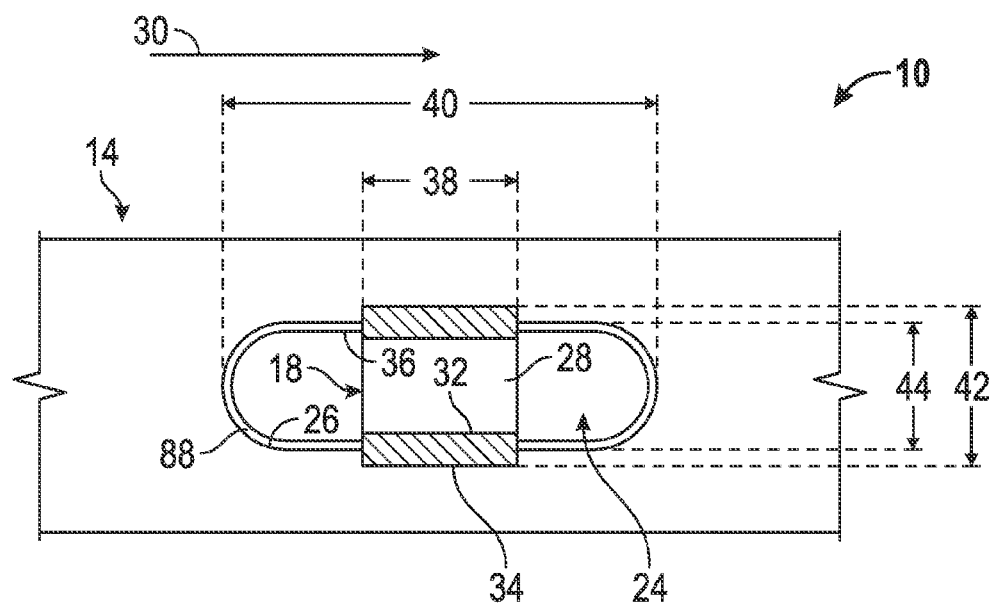
FIG. 2 is a top, cross-sectional view of the elastic tubular attachment assembly of FIG. 1 taken at line 2-2.

Referring to FIGS. 1 and 2, an elastic tubular attachment assembly 10 is illustrated. The elastic tubular attachment assembly 10 comprises matable components, such as a first component 12 and a second component 14 that are configured to be mated and aligned with respect to each other. In one embodiment, the elastic tubular attachment assembly 10 is employed in a vehicle application, and comprises vehicle interior components. However, it is to be understood that the components may be associated with numerous other applications and industries, such as home appliance and aerospace applications, for example.

Although illustrated in a specific geometry, the first component 12 and the second component 14 may be configured in numerous geometries. Irrespective of the precise geometry of the first component 12 and the second component 14, the first component 12 is configured to align and fittingly mate with the second component 14, which will be described in detail below. In an alternative embodiment, rather than two components comprising the elastic tubular attachment assembly 10, additional or intermediate layers or components may be included. It is to be appreciated that the elastic tubular attachment assembly 10 is to be employed for providing a self-aligning relationship between components, such as the first component 12 and the second component 14, to each other, while also assisting in securely mating the components to each other.

Figure 4:
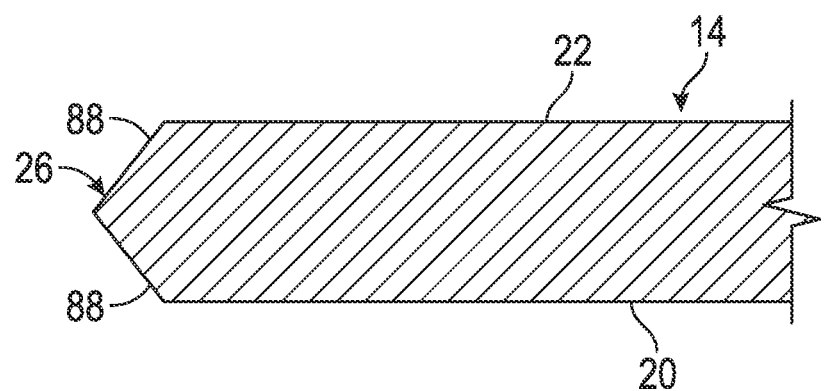
FIG. 4 is an enlarged, cross-sectional view of a second component of the elastic tubular attachment assembly.

The first component 12 comprises a first surface 16 having an elastically deformable tubular member 18 operatively coupled or integrally formed thereto. In one embodiment, the elastically deformable tubular member 18 is a molded component coupled thereto. The first surface 16 is typically substantially planar, but may be slightly curved, and may include a slight recess or groove 17 to accommodate a protruding portion of the elastically deformable tubular member 18. The second component 14 includes a second surface 20 and a third surface 22, which are each relatively planar and aligned substantially parallel to each other. However, as with the first surface 16 of the first component 12, the second surface 20 and the third surface 22 may include a slight degree of curvature. The second component 14 also includes an aperture 24 extending through the second component 14 from the second surface 20 to the third surface 22. The aperture 24 is defined by an aperture wall 26 that is positioned to contact and compress the elastically deformable tubular member 18. The aperture 24 is configured to at least partially receive the elastically deformable tubular member 18 therein upon mating of the first component 12 and the second component 14. As shown, the aperture wall 26 may include a chamfer portion 88 that comprises a beveled surface that is configured to provide a "lead-in," or guide, region for the outer surface 34 of the elastically deformable tubular member 18. Numerous angles of the chamfer portion 88 are contemplated, including an angle perpendicular to the second surface 20 and/or third surface 22. Additionally, the chamfer portion 88 of the aperture wall 26 may include two segments, as better illustrated in FIG. 4, that are disposed at an angle to each other. In such an embodiment, a lead in region, as described above, is provided, while the additional angled segment assists with compression of the second component 14 toward the first component 12 by the elastically deformable tubular member 18 upon mating of the components. Furthermore, the additional angled segment enhances stability of the joint by providing an interfacing surface contoured to align with the geometry of the elastically deformable tubular member 18. Such a contoured interfacing surface reduces or eliminates rotational tendencies of the matable components.

Figure 3:
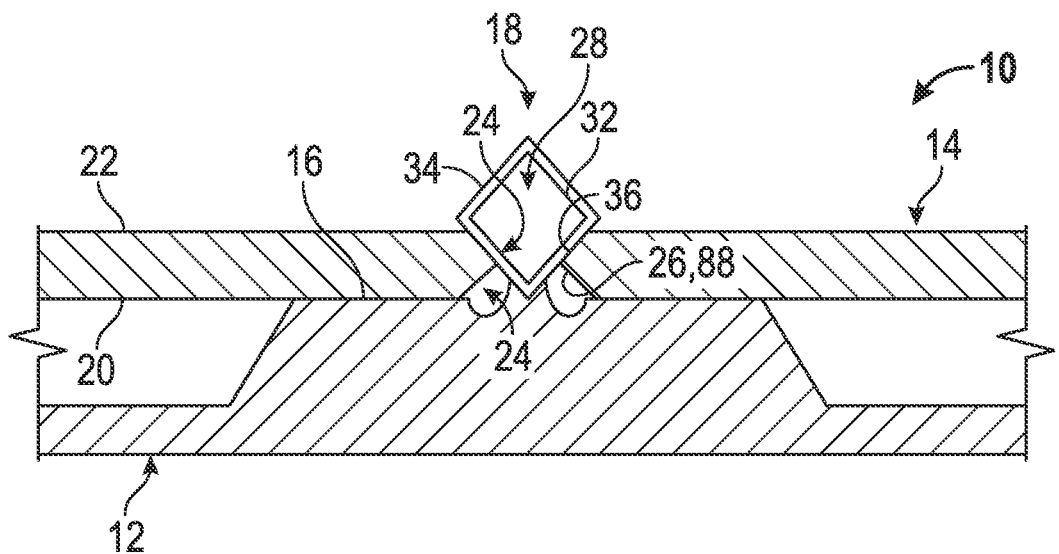
FIG. 3 is an elevational, partial cross-sectional view of the elastic tubular attachment assembly according to a second embodiment.

Although a solid embodiment of the elastically deformable tubular member 18 is contemplated, the elastically deformable tubular member 18 is typically formed with a hollow portion 28 extending in a longitudinal direction 30 of the elastically deformable tubular member 18. The hollow portion 28 is defined by an inner surface 32 of the elastically deformable tubular member 18, with the inner surface 32 disposed radially inwardly of the outer surface 34 of the elastically deformable tubular member 18. The elastically deformable tubular member 18 may be formed of numerous contemplated cross-sectional geometries, including the illustrated embodiment having a substantially circular geometry. The term "tubular" is employed to define an object having a hollowed portion and is not limited to a circular geometry, as additional geometries including, but not limited to, elliptical, tri-lobular, and quad-lobular, such as the diamond-shaped embodiment illustrated in FIG. 3, are all contemplated. The aperture 24 may comprise an elliptical geometry, as illustrated, or may be formed of an alternate geometry, such as rectangular, for example.

As will be apparent from the description herein, the elastically deformable nature of the tubular members, in combination with the particular orientations described above, facilitates precise alignment of the first component 12 relative to the second component 14 by accounting for positional variation of the retaining and/or locating features of the first component 12 and the second component 14 inherently present due to manufacturing processes. The self-aligning benefits associated with the elastic tubular attachment assembly 10 will be described in detail below.

The outer surface 34 of the elastically deformable tubular member 18 is positioned along the first component 12 to contact and engage with the aperture wall 26 of the second component 14 upon translation of the second component 14 toward the first component 12. Subsequent translation results in an elastic deformation of the elastically deformable tubular member 18 at a contact interface 36 defined by a contact region between the outer surface 34 and the aperture wall 26. Proximate the contact interface 36, the elastically deformable tubular member 18 is elastically deformed in a radially inwardly direction. It is to be appreciated that elastic deformation of the elastically deformable tubular member 18 is further facilitated by the hollow portion 28 facilitating radial inward movement of the inner surface 32. The void of material defined by the hollow portion 28 enhances the flexibility of the elastically deformable tubular member 18.

Any suitable elastically deformable material may be used for the elastically deformable tubular member 18. The term "elastically deformable" refers to components, or portions of components, including component features, comprising materials having a generally elastic deformation characteristic, wherein the material is configured to undergo a resiliently reversible change in its shape, size, or both, in response to application of a force. The force causing the resiliently reversible or elastic deformation of the material may include a tensile, compressive, shear, bending or torsional force, or various combinations of these forces. The elastically deformable materials may exhibit linear elastic deformation, for example that described according to Hooke's law, or non-linear elastic deformation.

Numerous examples of materials that may at least partially form the components include various metals, polymers, ceramics, inorganic materials or glasses, or composites of any of the aforementioned materials, or any other combinations thereof. Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS), such as an ABS acrylic. The material may be in any form and formed or manufactured by any suitable process, including stamped or formed metal, composite or other sheets, forgings, extruded parts, pressed parts, castings, or molded parts and the like, to include the deformable features described herein. The material, or materials, may be selected to provide a predetermined elastic response characteristic of the elastically deformable tubular member 18. The predetermined elastic response characteristic may include, for example, a predetermined elastic modulus.

The precise position where engagement between the outer surface 34 and the aperture wall 26 occurs will vary depending on positional variance imposed by manufacturing factors. Due to the elastically deformable properties of the elastic material comprising the elastically deformable tubular member 18, the criticality of the initial location of engagement is reduced. Further insertion of the elastically deformable tubular member 18 into the aperture 24 ultimately leads to a fully engaged position between the first component 12 and the second component 14. The elastically deformable tubular member 18 may be dimensionally sized in various configurations depending on the particular application, however, a tubular member length 38 is less than an aperture length 40, thereby permitting the elastically deformable tubular member 18 to fit through the aperture 24 with a clearance. The tubular member length 38 and the aperture length 40 are measured along the longitudinal direction 30. Additionally, a tubular member width 42 is greater than an aperture width 44. The tubular member width 42 referred to is defined herein as the maximum width of the elastically deformable tubular member 18. This is clearly illustrated in FIG. 2, which depicts a cross-sectional portion of the elastically deformable tubular member 18 at the aperture width 44 in an overlay arrangement with a cross sectional view of the second component 14.

Figure 5:
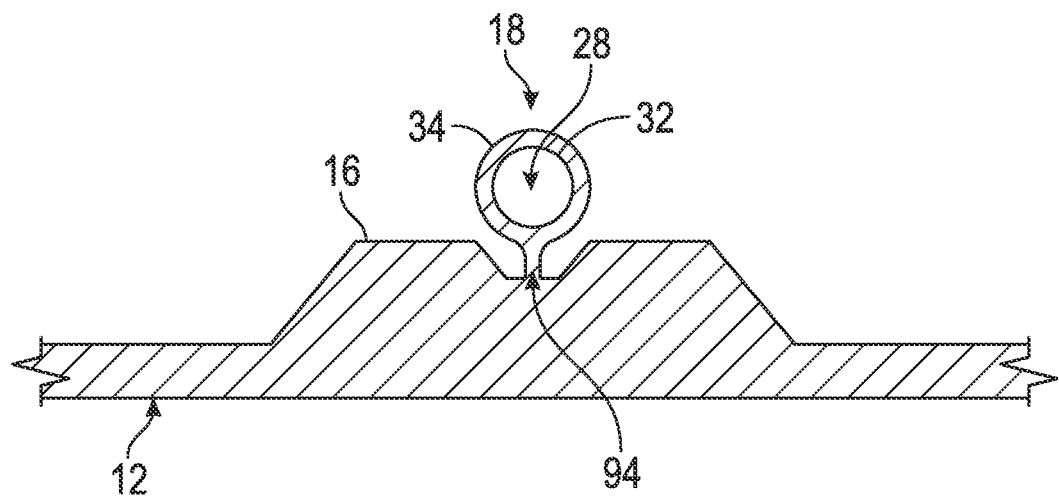
FIG. 5 is a cross-sectional view of the elastic tubular attachment assembly according to another embodiment.

Due to the tubular member width 42 being greater than the aperture width 44, contact interference between the outer surface 34 of the elastically deformable tubular member 18 and the aperture wall 26 is ensured by the point of translation of the second component 14 at the tubular member width 42, or maximum width. The interference between the elastically deformable tubular member 18 and the aperture wall 26 causes elastic deformation proximate the contact interface 36. The malleability of the material(s) reduces issues associated with positional variance. More particularly, in contrast to a rigid insert that typically results in gaps between the tubular member and aperture wall at portions around the perimeter of the tubular member, the elastically deformable tubular member 18 advantageously deforms to maintain alignment of the first component 12 and the second component 14, while also reducing or eliminating gaps associated with manufacturing challenges. As the second component 14 is translated beyond the tubular member width 42, the stored energy of the elastically deformable tubular member 18 exerts a force vector on the second component 14 that directs the second component 14 toward the first component 12. The compressive force exerted on the second component 14 causes the second surface 20 to engage the first surface 16, thereby resulting in the fully engaged position noted above. Additional flexibility may be achieved by including a standoff portion 94 of the first component 12 to extend between the elastically deformable tubular member 18 and the first surface 16 (FIG. 5). The increased flexibility advantageously enhances the alignment characteristics of the elastic tubular attachment assembly 10 by accounting for larger positional variation between the first component 12 and the second component 14. Therefore, the standoff portion 94 facilitates mating of the first component 12 and the second component 14 during translation of the second component 14 over the elastically deformable tubular member 18 toward the fully engaged position. Typically, in the fully engaged position the second component 14 is disposed closer to the first surface 16 of the first component 12 than the maximum width of the elastically deformable tubular member 18 is to the first surface 16. Additionally, the first surface 16 and the second surface 20 are typically in contact in the fully engaged position.

The first component 12 may include a plurality of elastically deformable tubular members, while the second component may include a plurality of apertures defined by a plurality of aperture walls. The plurality of apertures is positioned to correspondingly receive respective tubular members in a manner described in detail above. Various orientations of the tubular members are contemplated, including a substantially parallel alignment of the tubular members, a non-parallel alignment, or a combination of substantially parallel and non-parallel alignments.

The elastic deformation of the plurality of elastically deformable tubular members elastically averages any positional errors of the first component 12 and the second component 14. In other words, gaps that would otherwise be present due to positional errors associated with portions or segments of the first component 12 and the second component 14, particularly locating and retaining features, are eliminated by offsetting the gaps with an over-constrained condition of other elastically deformable tubular members. Specifically, the positional variance of each tubular member and/or aperture is offset by other tubular members to average in aggregate the positional variance of each tubular member. Elastic averaging provides elastic deformation of the interface(s) between mated components, wherein the average deformation provides a precise alignment, the manufacturing positional variance being minimized to $X_{min}$, defined by $X_{min} = X/\sqrt{N}$, wherein X is the manufacturing positional variance of the locating features of the mated components and N is the number of features inserted. To obtain elastic averaging, an elastically deformable component is configured to have at least one feature and its contact surface(s) that is over-constrained and provides an interference fit with a mating feature of another component and its contact surface(s). The over-constrained condition and interference fit resiliently reversibly (elastically) deforms at least one of the at least one feature or the mating feature, or both features. The resiliently reversible nature of these features of the components allows repeatable insertion and withdrawal of the components that facilitates their assembly and disassembly. Positional variance of the components may result in varying forces being applied over regions of the contact surfaces that are over-constrained and engaged during insertion of the component in an interference condition. It is to be appreciated that a single inserted component may be elastically averaged with respect to a length of the perimeter of the component. The principles of elastic averaging are described in detail in commonly owned, co-pending U.S. patent application Ser. No. 13/187,675, the disclosure of which is incorporated by reference herein in its entirety. The embodiments disclosed above provide the ability to convert an existing component that is not compatible with the above-described elastic averaging principles to an assembly that does facilitate elastic averaging and the benefits associated therewith.

Figure 6:
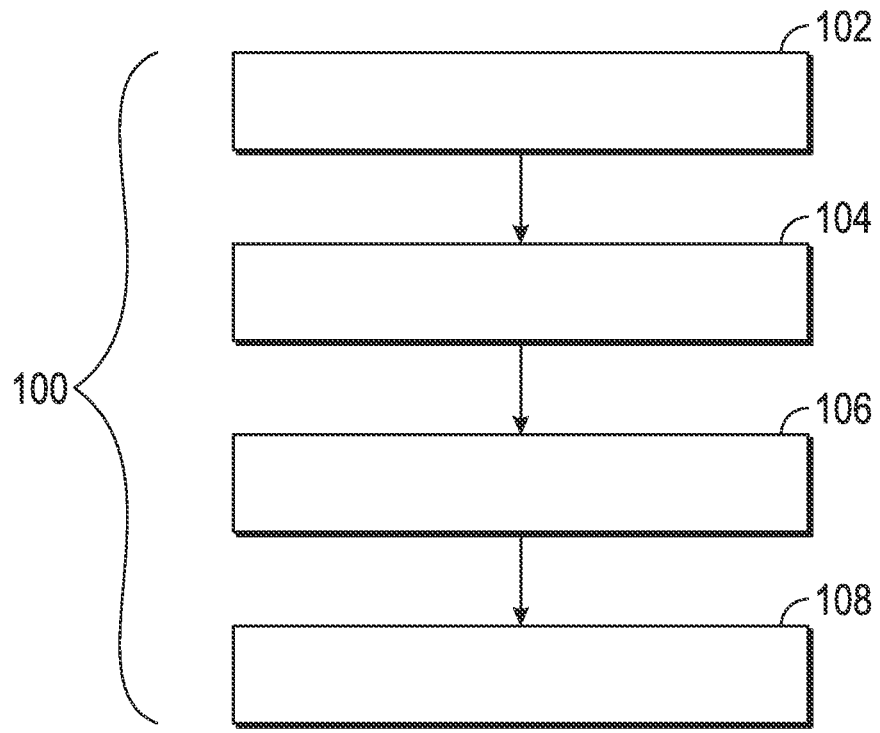
FIG. 6 is a flow diagram illustrating a method of mating components with the elastic tubular attachment assembly.

A method of mating components 100 is also provided, as illustrated in FIG. 6, and with reference to FIGS. 1-5. The elastic tubular attachment assembly 10, and more specifically the elastically deformable nature of the elastically deformable tubular member 18, has been previously described and specific structural components need not be described in further detail. The method 100 includes inserting 102 the elastically deformable tubular member 18 into the aperture 24. The method also includes contacting 104 the outer surface 34 of the elastically deformable tubular member 18 with the aperture wall 26 at the contact interface 36 to impose a contact interference condition between the first component 12 and the second component 14. The method further includes elastically deforming 106 the elastically deformable tubular member 18 upon contacting 104 the aperture wall 26. The method yet further includes translating 108 the second component 14 toward the first component 12 beyond a maximum tubular member width.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An elastic tubular attachment assembly for mating components, the elastic tubular attachment assembly comprising:
a first component having a planar first surface;
a second component having a planar second surface, a third surface opposite and parallel to the second surface, and at least one aperture extending through the second and third surfaces and being defined by an aperture wall, wherein the second surface is configured to align and engage with the first surface of the first component, the aperture wall comprising a first angled portion extending from the second surface and a second angled portion extending from the third surface;
at least one elastically deformable hollow tubular member longitudinally extending parallel to and operatively coupled to the first component proximate the first surface, the at least one elastically deformable tubular member comprising an outer surface, wherein a standoff portion of the first component integrally extends between the at least one elastically deformable tubular member and the first surface, the standoff portion being formed by a surrounding recess in the first surface such that the outer surface of the tubular member is adjacent the plane of the first surface, wherein each at least one elastically deformable tubular member is formed of an elastically deformable material and configured to elastically deform radially inwardly upon contact with the aperture wall of a respective at least one aperture in the second component, the first angled portion of the aperture wall extending radially inwardly as the first angled portion extends from the second surface toward the third surface to reduce the cross-sectional area of the aperture to initially receive the elastically deformable tubular member during engagement, the second angled portion extending radially outwardly as the second angled portion extends from the first angled portion toward the third surface and being contoured to correspond with a geometry of the outer surface of the elastically deformable tubular member and compressing the elastically deformable tubular member in a fully engaged position of the first and second components, wherein the first surface and the second surface are in planar contact, to stabilize the elastically deformable tubular member.

2. The elastic tubular attachment assembly of claim 1, wherein the at least one elastically deformable tubular member comprises a tubular member width and the at least one aperture comprises an aperture width, and wherein the tubular member width is greater than the aperture width.

3. The elastic tubular attachment assembly of claim 2, wherein the fully engaged position comprises contact interference between the outer surface of the at least one elastically deformable tubular member and the at least one aperture wall of the second component.

4. The elastic tubular attachment assembly of claim 3, wherein the fully engaged position corresponds to a location of the second component that is closer to the first surface of the first component than the tubular member width of the at least one elastically deformable tubular member is to the first surface.

5. The elastic tubular attachment assembly of claim 1, wherein the at least one elastically deformable tubular member comprises a tubular member length and the at least one aperture comprises an aperture length, and wherein the aperture length is greater than the tubular member length.

6. The elastic tubular attachment assembly of claim 1, wherein the at least one elastically deformable tubular member comprises a substantially circular cross-section.

7. The elastic tubular attachment assembly of claim 1, wherein the at least one elastically deformable tubular member comprises a substantially diamond-shaped cross-section.

8. The elastic tubular attachment assembly of claim 1, wherein the longitudinal directions of the at least one elastically deformable tubular member and the at least one aperture are substantially aligned.

9. The elastic tubular attachment assembly of claim 1, wherein the at least one elastically deformable tubular member comprises a plurality of elastically deformable tubular members, and wherein the at least one aperture comprises a plurality of apertures corresponding to each of the plurality of elastically deformable tubular members.

10. The elastic tubular attachment assembly of claim 9, wherein the plurality of elastically deformable tubular members are aligned relatively parallel to each other.

11. The elastic tubular attachment assembly of claim 9, wherein the plurality of elastically deformable tubular members are aligned in a non-parallel manner.

12. The elastic tubular attachment assembly of claim 9, wherein an amount of deformation of the plurality of elastically deformable tubular members is averaged in aggregate relative to each other when the first component and the second component are disposed in the fully engaged position.

13. The elastic tubular attachment assembly of claim 1, wherein the first component and the second component comprise vehicle components.

* * * * *